US012488178B2

(12) United States Patent
Turner et al.

(10) Patent No.: US 12,488,178 B2
(45) Date of Patent: Dec. 2, 2025

(54) VERIFYING CONTENT AND INTERACTIONS WITHIN WEBVIEWS

(71) Applicant: Google LLC, Mountain View, CA (US)

(72) Inventors: David Bruce Turner, Newark, CA (US); Aaron Michael Packer, Mountain View, CA (US); Zachary Loebel-Fried, Half Moon Bay, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 17/426,258

(22) PCT Filed: Jun. 24, 2020

(86) PCT No.: PCT/US2020/039329
§ 371 (c)(1),
(2) Date: Jul. 28, 2021

(87) PCT Pub. No.: WO2021/262159
PCT Pub. Date: Dec. 30, 2021

(65) Prior Publication Data
US 2023/0124545 A1    Apr. 20, 2023

(51) Int. Cl.
*G06F 40/14* (2020.01)
*G06F 21/57* (2013.01)
(Continued)

(52) U.S. Cl.
CPC ........... *G06F 40/14* (2020.01); *G06F 21/577* (2013.01); *G06F 21/602* (2013.01); *G06F 40/134* (2020.01); *G06F 2221/033* (2013.01)

(58) Field of Classification Search
CPC ...... G06F 40/14; G06F 40/134; G06F 21/577; G06F 21/602; G06F 2221/033
(Continued)

(56) References Cited

U.S. PATENT DOCUMENTS 8,286,248 B1 * 10/2012 Oliphant ............. H04L 63/1433
726/25
9,582,598 B2    2/2017 Kalgi
(Continued)

FOREIGN PATENT DOCUMENTS

CN    107864677    3/2018
CN    108604272    9/2018
(Continued)

OTHER PUBLICATIONS

Library; Microsoft Computer Dictionary; May 1, 2002; Microsoft Press; Fifth Edition; p. 309.*
(Continued)

*Primary Examiner* — Andrew R Dyer
(74) *Attorney, Agent, or Firm* — Fish & Richardson P.C.

(57) ABSTRACT

Methods, systems, and apparatus, including computer programs encoded on a computer storage medium, for verifying content provided for display within a webview and interactions with such content. Methods can include providing, within a webview executing in a portion of an application launched on a client device, a first content page including a digital component and detecting, by a script executing within the webview, a set of interaction signals. After detection of the set of interaction signals, the signals can be transferred from the webview, via a communication bridge, to a software library that is resident within the native layer. The software library transmits the set of interaction signals to a first content provider, which can determine whether the interaction signals indicate interactions by an actual human user as opposed to automated interactions. The software library then launches a second content page that is linked to by the digital component.

18 Claims, 5 Drawing Sheets

(51) Int. Cl.
*G06F 21/60* (2013.01)
*G06F 40/134* (2020.01)

(58) Field of Classification Search
USPC .......................................................... 715/234
See application file for complete search history.

(56) References Cited

U.S. PATENT DOCUMENTS

| | | | | |
|---|---|---|---|---|
| 10,187,375 | B1* | 1/2019 | Kincaid | H04L 9/3247 |
| 2010/0287229 | A1 | 11/2010 | Hauser | |
| 2013/0311871 | A1* | 11/2013 | Turner | G06Q 10/00 |
| | | | | 715/234 |
| 2015/0019944 | A1* | 1/2015 | Kalgi | G06Q 20/3552 |
| | | | | 715/205 |
| 2015/0112892 | A1 | 4/2015 | Kaminsky et al. | |
| 2017/0185758 | A1 | 6/2017 | Oliker et al. | |
| 2020/0145384 | A1* | 5/2020 | Chauhan | G06F 16/95 |
| 2020/0242251 | A1* | 7/2020 | Wisgo | G06F 21/564 |

FOREIGN PATENT DOCUMENTS

| | | |
|---|---|---|
| CN | 109446807 | 3/2019 |
| JP | 2008-269364 | 11/2008 |
| JP | 2010-514070 | 4/2010 |

OTHER PUBLICATIONS

Kirupa, Understanding WebViews, Apr. 26, 2019, sirupa.com, pp. 1-11.*

Office Action in Indian Appln. No. 202127031457, dated Feb. 21, 2023, 8 pages (with English transaction).

Office Action in European Appln. No. 20743401.0, dated Nov. 25, 2022, 7 pages.

Wikipedia.org [online], "Client-server model" Jun. 17, 2022, retrieved on Nov. 21, 2022, retrieved from URL <https://en.wikipedia.org/w/index.php?title=Client%E2%80%93server_model&oldid=962987183>, 6 pages.

Dong et al., "Frauddroid: Automated ad fraud detection for android apps," Proceedings of the 2018 26th ACM Joint Meeting on European Software Engineering Conference and Symposium on the Foundations of Software Engineering, Lake Buena Vista, FL, USA, Nov. 4-9, 2018; Oct. 2018, 257-268.

InternetofThingsAgenda.techtarget.com [online], "Unique Identifier (UID)," Feb. 2019, retrieved on Aug. 11, 2021, retrieved from URL<https://internetofthingsagenda.techtarget.com/definition/unique-identifier-UID>, 3 pages.

Oppliger et al., "Does trusted computing remedy computer security problems?," IEEE Security & Privacy, Apr. 2005, 3(2):16-19.

PCT International Search Report and Written Opinion in International Appln. No. PCT/US2020/039329, dated Feb. 23, 2021, 15 pages.

International Preliminary Report on Patentability in International Appln. No. PCT/US2020/039329, mailed on Jan. 5, 2023, 9 pages.

Office Action in European Appln. No. 20743401.0, dated Jun. 10, 2022, 6 pages.

Office Action in European Appln. No. 20743401.0, dated Mar. 2, 2022, 8 pages.

Office Action in Japanese Appln. No. 2021-544613, dated Oct. 31, 2022, 10 pages (with English translation).

Cao et al., "AdSherlock: Efficient and Deployable Click Fraud Detection for Mobile Applications" IEEE Transactions on Mobile Computing, Jan. 2020, 20(4):1285-1297.

Office Action in European Appln. No. 20743401.0, dated Mar. 21, 2023, 5 pages.

Notice of Allowance in Japanese Appln. No. 2021-544613, dated Apr. 3, 2023, 5 pages (with English transaction).

Wikipedia.org [online], "Bridge Pattern" May 12, 2020, retrieved on Jul. 21, 2023, retrieved from URL <https://en.wikipedia.org/w/index.php?title=Bridge_pattern&oldid=956329467>, 9 pages.

Wikipedia.org [online], "Code Reuse" Jun. 5, 2020, retrieved on Jul. 21, 2023, retrieved from URL <https://en.wikipedia.org/w/index.php?title=Code_reuse&oldid=960963748>, 4 pages.

Office Action in Korean Appln. No. 10-2021-7025344, mailed on Jan. 24, 2024, 12 pages (with English translation).

Office Action in Chinese Appln. No. 202080011804.5, mailed on Dec. 18, 2024, 14 pages (with English translation).

* cited by examiner

VERIFYING CONTENT AND INTERACTIONS WITHIN WEBVIEWS

CROSS-REFERENCE TO RELATED APPLICATION

This application is a National Stage Application under 35 U.S.C. § 371 and claims the benefit of International Application No. PCT/US2020/039329, filed Jun. 24, 2020. The disclosure of the foregoing application is hereby incorporated by reference in its entirety.

BACKGROUND

This specification generally relates to data processing and verifying content provided for display within a webview executing within a native application as well as interactions with the content within the webview.

A client device can display digital web content that is provided by one or more content providers, e.g., within a commercial web browser or through a native application (other than a commercial web browser) executing a webview. As used in this specification, a webview may include a browser engine contained within a native application that can (1) render web pages, (2) read, compile, and/or execute scripts and/or web code (such as JavaScript™, cascading style sheets (CSS), extensible markup language (XML) etc.) to generate graphical user interfaces, and/or (3) enable communication with servers (e.g., content providers, content platforms, etc.).

SUMMARY

In general, one innovative aspect of the subject matter described in this specification can be embodied in methods including the operations of providing, within a webview executing in a portion of an application launched on a client device, a first content page including a digital component; detecting, by a script executing within the webview, a set of interaction signals representing one or more interactions with the digital component; transferring, via a communication bridge between a native layer of the application and the webview, the set of interaction signals from the webview to a software library that is resident within the native layer; transmitting, by the software library, the set of interaction signals to a first content provider for an evaluation of whether the set of interaction signals indicate interactions by a human user of the client device with the digital component instead of an automated interaction; and launching, by the software library and in response to the one or more interactions with the digital component, a second content page that is linked to by the digital component and that is provided by the first content provider. Other embodiments of this aspect include corresponding methods, apparatus, and computer programs, configured to perform the actions of the methods, encoded on computer storage devices.

These and other embodiments can each optionally include one or more of the following features.

Methods can further include generating, by the script executing within the webview, a request for digital content, wherein the request includes a unique identifier for the webview that is assigned to the webview by the native layer and wherein the request for digital content includes an encrypted dataset that is generated by encrypting the environment trustworthiness data and the unique identifier; providing the request for digital content to a second content provider, wherein the second content provider is different from the first content provider; in response to providing the request for digital content to the second content provider, receiving, from the second content provider, data including the digital component and the unique identifier; verifying that the data received from the content provider includes the unique identifier; in response to verifying that the data received from the content provider includes the unique identifier, providing the digital component within the webview.

Methods can include sending, by the script and via the communication bridge, a request for environment trustworthiness data to the software library, wherein the environment trustworthiness data includes data about the native application and the client device for assessing a trustworthiness of the native application and the client device; and receiving, from the software library and via the communication bridge, the environment trustworthiness data.

Methods can include launching the second content page is executed in response to the evaluation of the interaction signals indicating interaction by a human user and wherein launching the second content page comprises launching a web browser application and accessing the URL for the second content page within the web browser application.

Methods can include determining, by the software library, that the unique identifier of the webview matches the unique identifier that was included in the data that was received from the content provider.

Methods can include providing the set of interactions signals to the first content provider further includes providing the environment trustworthiness data to the first content provider that further includes appending data representing the set of interaction signals and the environment trustworthiness data to a uniform resource locator (URL) for a second content page that is provided by the first content provider and that is linked to by the digital component.

Particular embodiments of the subject matter described in this specification can be implemented to realize one or more of the following advantages. For example, the techniques described in this specification enable content providers to verify whether interactions with digital components (e.g., digital media items, digital ads, or links to other content pages) that are provided for display within a webview, are interactions by an actual human user as opposed to automated interactions (e.g., interactions that may have been erroneously generated due to a software defect/bug and/or falsified as being generated by a human user by malicious code/entity). Webviews are implemented as a container class within the native application and generally cannot access the resources running in the native layer of the underlying native application. As a result, interaction verification resources of the native layer are inaccessible by the webview and thus, these resources cannot be leveraged in verifying interactions with digital components provided for display within the webview using existing systems. In contrast, the techniques described in this specification implement a software bridge (e.g., a JavaScript™ bridge) between the native layer and the webview that enables utilization of the native layer's interaction verification resources to assist in the verification of interactions with digital components within the webview.

The techniques described in this specification also prevent execution of malicious or other unwanted/unrequested code from executing within the webview. Because webviews are implemented as a container class within the native application, the native layer of an application generally does not have control over the content received and displayed within the webview. As a result, a webview may receive malicious code and/or content that can compromise the webview (and/or the interactions between the webview and the native layer), the underlying native application, and/or the client device. For example, this can happen if the webview requests content from one content provider but instead receives content/code from an entity other than the content provider to whom the request was sent (e.g., a malicious entity). To address these problems, the techniques described in this specification utilize the software resources resident in the native layer of the application to verify whether the content provider to whom a request was sent is the same content provider from whom the content was received.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
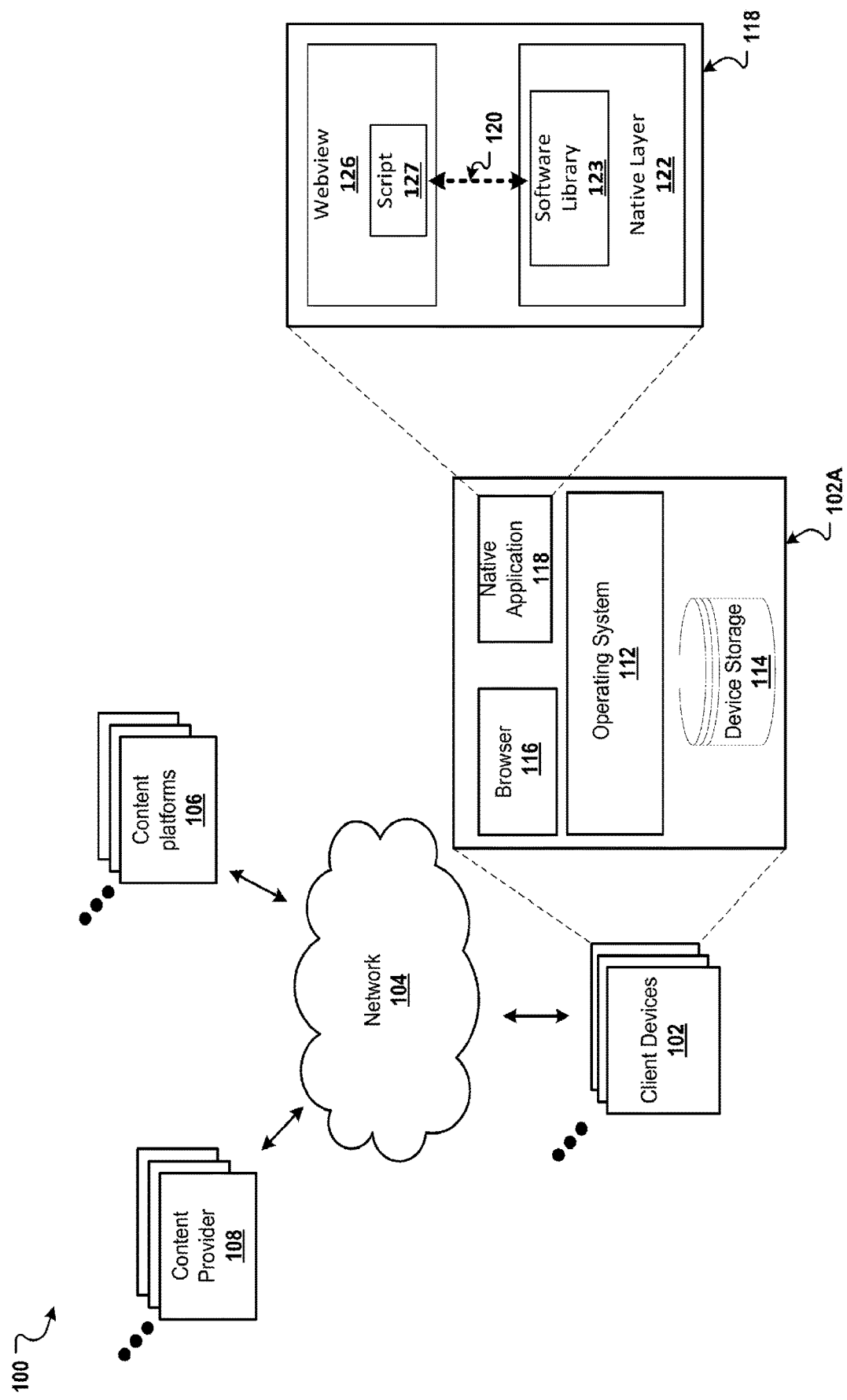
FIG. 1 is a block diagram of an example environment 100 in which content pages and digital components are distributed and provided for display on a client device.

This specification generally relates to verifying content provided for display within a webview executing within a native application as well as interactions with the content within the webview.

A content provider may want to verify that an interaction with a digital component displayed within a webview of the application is an interaction performed by an actual human user of the client device, and not some falsified indication of a human interaction. The techniques described in this specification, as summarized below and as described in additional detail throughout this specification, enable such interaction verification by executing a script in the webview to detect interaction signals with the digital components and transmitting the interaction signals from the webview to a software library residing in the native layer of the application using a communication bridge between the webview and the native layer of the application. After receiving the interaction signals from the webview, the software library in the native layer transmits the interaction signals (and/or additional environment trustworthiness data (as further described in this specification)) to the content provider, which in turn can evaluate whether the interaction signals indicate interactions by an actual human user of the client device (as opposed to automated interactions that are generated, e.g., erroneously due to software defects/bugs and/or falsified by malicious code/entity).

As used in this specification, the communication bridge is a software bridge that connects the native layer of the native application with the webview of the native application, and enables communication and data transmission between the webview and the native layer. In some implementations, the communication bridge can be implemented as a JavaScript™ bridge. In some implementations, the JavaScript™ bridge is implemented by the operating system (OS) of the client device. Examples of such OS may include Android™ or iOS™. For example, the JavaScript™ bridge can be implemented using an application programming interface (API) that is provided by the OS.

In addition to verifying interactions within the webview, the techniques summarized below and described throughout this specification verify that the content provided for display within the webview is indeed provided by the content provider from which such content was requested. This verification attempts to prevent reception of unwanted and/or malicious code by the webview, which in turn can prevent the webview, the native application, and/or the client device from being compromised. To enable such content verification, the software library in the native layer of the application assigns a unique identifier to the webview and provides this unique identifier along with environment trustworthiness data (as further described in this specification) to the webview. In some implementations, the software library can encrypt the unique identifier and the environment trustworthiness data before transmitting to the webview of the application. In such implementations, the webview provides this encrypted unique identifier and the environment trustworthiness data along with a request for content to a content provider.

Upon receiving the content request, the content provider can decrypt the encrypted unique identifier and the environment trustworthiness to extract the unique identifier. The content provider can then include the unique identifier along with the data (e.g., digital component) in a message that is transmitted to the webview. Before the digital component is provided for display within the webview, the webview sends the received unique identifier (via the communication bridge) to the software library, which verifies whether the received unique identifier is the same as the unique identifier assigned to the webview. If the received unique identifier is the same as the unique identifier assigned to the webview, the software library can determine that the received digital component can be provided for display within the webview and instructs the webview to provide the digital component for display. On the other hand, if the received unique identifier is not the same as the unique identifier assigned to the webview, the software library determines that the received digital component cannot be provided for display within the webview and instructs the webview not to display this digital component.

These features and additional features are further described below with reference to FIGS. 1-4.

FIG. 1 is a block diagram of an example environment 100 in which content pages and digital components are distributed and provided for display on a client device. The example environment 100 includes a network 104. The network 104 can include a local area network (LAN), a wide area network (WAN), the Internet or a combination thereof. The network 104 can also comprise any type of wired and/or wireless network, satellite networks, cable networks, Wi-Fi networks, mobile communications networks (e.g., 3G, 4G, and so forth) or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof. The network 104 connects client devices 102, content providers 106. The example environment 100 may include many different content platforms 106, content providers 108 and client devices 102.

A content platform 106 is a computing platform (such as, e.g., a data processing apparatus as described with reference to FIG. 5) that enables distribution of content. Example content platforms 106 include search engines, social media platforms, new platforms, data aggregator platforms, or other content sharing platforms. Each content platform 106 may be operated by a content platform service provider.

The content platform 106 can publish and make available its own content. For example, the content platform 106 may be a news platform, which publishes its own news articles. The content platform 106 may also present content provided by one or more content providers 108 that are not part of the content platform 106. In the above example, the news platform may also present third party content provided by one or more content providers 108. As another example, the content platform 106 may be a data aggregator platform that does not publish any of its own content, but aggregates and presents third party content provided by different content providers 108.

As used in this specification, a content provider 108 can be a data processing apparatus (as described with reference to FIG. 5) and can include servers, repositories, or other storage devices that store content generated and/or published by one or more entities and that provide content to content platforms 106 and/or client devices 102 in response to requests for content from these entities.

A client device 102 is an electronic device that is capable of requesting and receiving content over the network 104. Example client devices 102 include personal computers, mobile communication devices, digital assistant devices, and other devices that can send and receive data over the network 104.

An example client device 102A typically comprises an operating system 112 that is primarily responsible for managing the device hardware such as device storage 114 and software resources, such as applications. The client device 102A typically includes applications, such as a web browser 116, to facilitate the sending or receiving of data over the network 104 and presenting content pages on the client device 102, but native applications 118 (other than web browsers) executing on the client device 102 can also facilitate the sending or receiving of data over the network 104 and presenting the content pages on the client device, e.g., using webviews executing within these native applications.

In some implementations, the application 118 that is executed on the client device 102 includes a native layer, which may be an executable object compiled for execution on the client device 102 (e.g., compiled for the software and hardware environment of the client device 102A, such as the operating system, the processor, the chipset, etc.). In some implementations, the native layer 122 can further include a software library 123. As used throughout this specification, the software library 123 may include computer executable resources running in the native layer of the underlying native application that enable performing one or more operations. For example, and as described throughout this specification, the software library 123 may enable and/or assist with the verification of content provided in webviews and/or interactions with content provided in the webview.

In some implementations, the application 118 can also be configured to include a webview 126. As used in this specification, a webview can read, compile, and/or execute web code and/or technologies, such as JavaScript™, cascading style sheets (CSS), extensible markup language (XML) etc., to generate graphical user interfaces, communicate with web servers, and perform other web client functions. In some implementations, the webview of the application loads a script along with content pages that are provided by the content providers. For example, the script 127 can be JavaScript™ code that is loaded along with the content pages and that executes within the webview 126 of the application 118.

The webview 126 can communicate with content providers to request a content page from a content provider and upon receiving such content, the webview can provide this content for display. A user of the client device 102A can interact with one or more digital components provided on the received content page within the webview.

As described above, in conventional systems, content provided within webviews and the interactions with such content cannot be verified. In contrast, the following descriptions of FIGS. 2 and 3 enable verification of content provided within webviews and verification of the interactions with such content.

Figure 2:
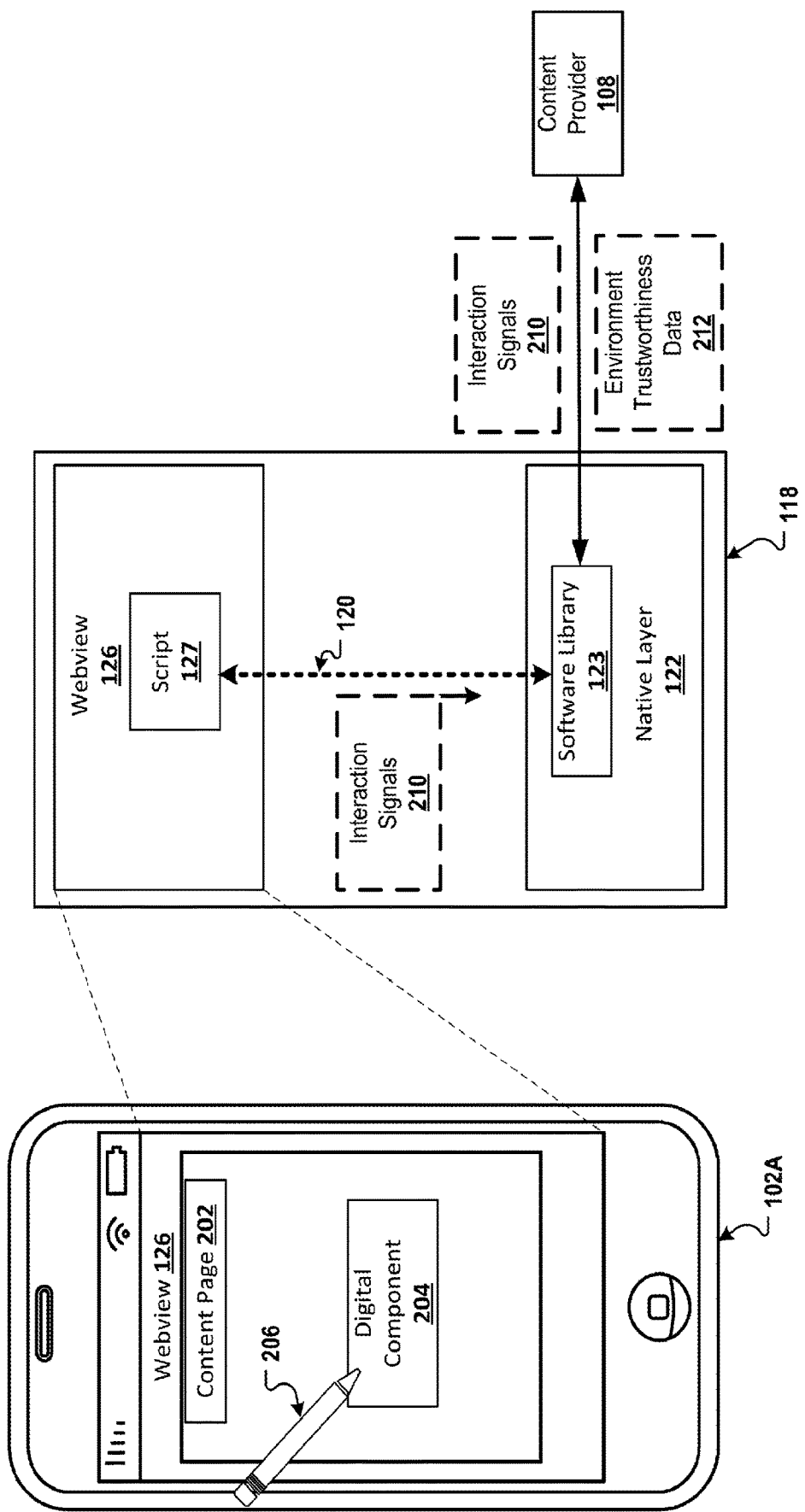
FIG. 2 is a block diagram that illustrates the operations performed by the components of FIG. 1 in verifying whether interactions with digital components provided within a webview are interactions by an actual human user.

FIG. 2 is a block diagram 200 that illustrates the operations performed by the components of FIG. 1 in verifying whether interactions with digital components provided within a webview are interactions by an actual human user.

As depicted in FIG. 2, the client device 102A (e.g., a smartphone) accesses a first content page 202 that is provided by a content provider and presented for display within webview 126 of the native application 118. For example, the first content page 202 may be a content page provided by a news aggregator platform that includes news articles that are provided by different content providers 108. As another example, the first content page 202 may be a content page provided by a social media platform that presents media items provided by one or more content providers 108. As depicted in FIG. 2, the first content page 202 can also include a digital component 204 that is linked to a second content page that can be provided by the same content provider or a different content provider. As used in this specification, a digital component is a discrete unit of digital content or digital information such as, e.g., a video clip, an audio clip, a multimedia clip, an image, text, a uniform resource locator (URL), or another unit of content.

FIG. 2 further shows operations/interactions occurring within the native application 118 and in particular, shows the operations/interactions occurring between the native layer 122 and webview 126. The native layer 122 is an executable object compiled for execution on the client device 102A and is based on the software and hardware environment of the client device 102A, such as operating system, processor, chipset, etc. The webview 126 can read, compile, and/or execute web code and/or technologies, such as JavaScript™, cascading style sheets (CSS), extensible markup language (XML), etc., to generate graphical user interfaces, communicate with web servers, and perform other web client functions. As described above, webviews are implemented as a container class within the native application and cannot directly access the resources running in the native layer of the underlying native application. Thus, for the webview to access these resources in the native layer, a communication bridge between the webview and the native layer is required (as explained above and in further detail throughout this specification).

In some implementations, the webview 126 loads a script along with a content page that is provided by a content provider. The webview further presents the content pages on the client device 102A and enables the user of the client device 102A to interact with digital components that are included in the content pages.

A user may interact with (e.g., pressing his/her finger and/or a stylus 206 on the touch sensitive screen of the client device 102A) the digital component 204. In response to this interaction, the webview can launch a second content page that is linked to by the digital component 204. In some instances, interactions that are recorded with the digital component 204 may have been generated erroneously (e.g., because of a software defect or bug in the application and/or the webview) or may have been generated by malicious code executing within the application (e.g., code injected by a malicious entity to falsify an interaction with the digital component).

To enable verification of whether the interaction with the digital component 204 within the webview is performed by an actual human user of the client device 102A, the script executing within the webview detects a set of interaction signals generated by the interaction with the digital component. Examples of such interaction signals detected by the script may include, the coordinates of the location where the interaction was detected (e.g., the point of contact on a touch-sensitive screen) and the amount of time for which the contact was performed. For example, if the user of the client device 102A uses a stylus 206 to interact with the digital component 204, the script can detect interaction signals that may include the coordinates of the position where the stylus 206 made contact and the amount of time for which the contact was performed.

After detecting the set of interaction signals, the script 127 executing in the webview 126 transmits the set of interaction signals 210 to the software library in the native layer of the application via the communication bridge. For example, after detecting the set of interaction signals 210 by the script 127 that is executing in the webview 126, the script 127 transmits the set of interaction signals to the software library 123 in the native layer 122 via the communication bridge 120.

In some implementations, the software library 123 in the native layer 122 is configured to operate, alone or in conjunction with the operating system of the client device 102A, to collect signals regarding software and hardware environment of the client device 102A and/or the native application 118. Examples of the signals collected include, but are not limited to, the operating system version running on the client device, the chipset used on the client device, an identifier for the native application, the version of the native application, whether the native application was downloaded from an official application store, the type of client device, the model of the client device, evidence of whether the device has been rooted and/or jailbroken, when the operating system of the client device was last updated, whether the native application 118 is running on an emulator, etc. The signals may also include details regarding other hardware and/or software resources in the client device 102A that may be responsible for execution of the application 118 on the client device 102A. These signals, which are collectively referred to as environment trustworthiness data 212, can be used by the content provider to determine the trustworthiness of the client device 102.

In some implementations, after receiving the set of interaction signals from the webview 126, the software library 123 transmits the set of interaction signals 210 alone or in combination with the environment trustworthiness data 212 to the content provider 108. In some implementations, the software library appends data representing the set of interaction signals and the environment trustworthiness data to a uniform resource locator (URL) for a second content page that is provided by the content provider 108 and that is linked to by the digital component 204.

In some implementations, the software library can launch a separate web browser application (e.g., application 116) and access the URL referenced in the preceding paragraph. By navigating to this URL, the software library 123 provides to the content provider 108 (and the content provider 108 receives), the set of interaction signals and the environment trustworthiness data. Alternatively, the URL can be launched within the webview 126.

Based on the received interaction signals 210 and/or the environment trustworthiness data 212 (e.g., as included in the URL used to access the second content page provided by the content provider 108), the content provider 108 can verify whether the interactions with the digital component 204 in the webview are by an actual human user of the client device 102A.

The content provider 108 may implement, e.g., a machine learning model, a rules-based engine, or another appropriate technique that processes the set of interaction signals 210 and/or the environment trustworthiness data 212 to determine whether the interactions performed on the webview 126 are generated by an actual human user of the client device 102A. In implementations where the content provider 108 includes a rules-based engine, this engine can analyze the interaction signals and/or the environment trustworthiness data using a set of rules to determine whether the interactions within the webview are interactions by an actual human user. Alternatively, in implementations where the content provider 108 includes a machine learning model (e.g., a supervised or unsupervised learning model), this model accepts the environment trustworthiness data and/or the interaction signals as an input and outputs a determination (e.g., a binary determination, or a likelihood assessment) as to whether the interaction within the webview was performed by an actual human user. For example, the machine learning model can be a supervised model that is trained using training data for multiple client devices, which includes interaction signals and environment trustworthiness data for each such device and the known, corresponding determination as to whether the interaction within a webview for the respective device was by an actual human user or not.

Based on the determination as to whether the interaction with the digital component in the webview was an interaction by an actual human user, the content provider 108 can take at least the following actions. If the content provider 108 determines that the interaction was not by an actual human user, the content provider 108 can refuse access to the second content page that is linked to by the digital component 204. This could save resources at the content provider such as server processing power and network bandwidth by way of avoiding the delivery of content to a potentially compromised device. In the case of a denial of service, DoS attack originating at one or more client devices, this could be a significant saving, and could even prevent the content provider from being overwhelmed with malicious requests from one or more client devices. 102A. On the other hand, if the content provider 108 determines that the interaction was by an actual human user, the content provider 108 can allow access to the second content page that is linked to by the digital component 204. In some implementations, if the content provider 108 determines that the interaction was not by an actual human user, the content provider 108 can nevertheless allow access to the second content page linked to by the digital component 204, but may record details about the client device 102A and/or application 118 from which the interaction originated, to prevent or limit subsequent delivery of content to that device/application which, as mentioned previously, could save resources at the content provider by way of avoiding the delivery of content to a potentially compromised client device 102A.

Alternatively, instead of the content provider 108 verifying whether interactions within the webview are interactions by an actual human user, such verification may be performed by the software library 123. For example, the native application can be configured to include certain frameworks (as described with reference to the content provider 108 in the preceding paragraph) for determining whether the interactions performed on the webview are generated by an actual human user of the client device. In such implementations, if the software library 123 determines that the interaction was not by an actual human user, the software library 123 can refuse to launch a separate browser application (e.g., application 116) and/or prevent access to the second content page that is linked to by the digital component 204 within this application 116. This could save resources such as processing power, memory usage, network usage and battery power of a potentially compromised client device 102A. On the other hand, if the software library 123 determines that the interaction was by an actual human user, the software library 123 can launch the application 116 and navigate to (e.g., by accessing the URL for) the second content page within the application 116.

In summary, the above description describe how interactions with digital components in webviews are verified as interactions by actual human users of the client device. The following description of FIG. 3 explains how a digital component provided for display within the webview is verified as being provided by the intended content provider (i.e., a content provider to whom a request for content was sent).

Figure 3:
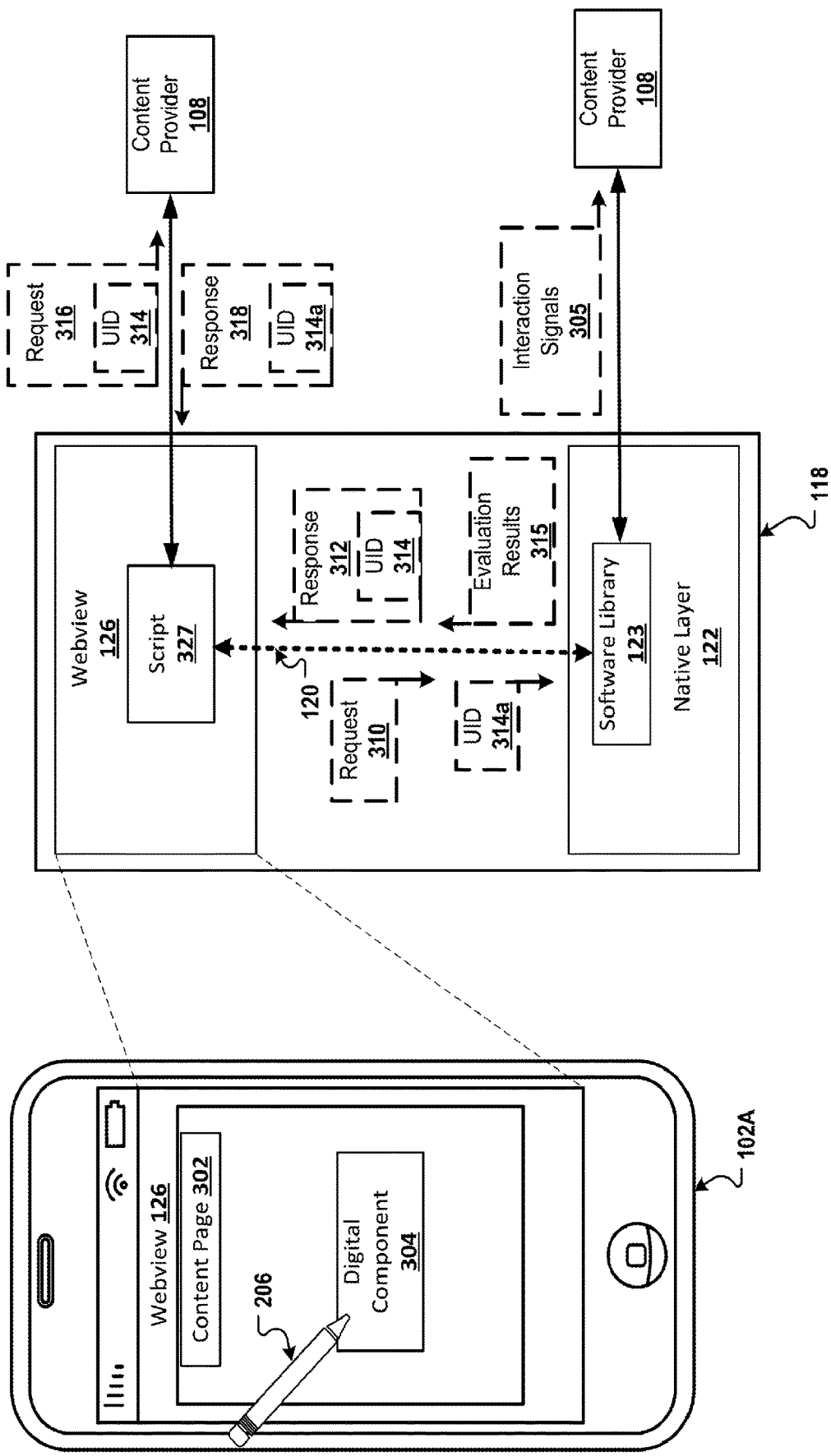
FIG. 3 is a block diagram that illustrates operations performed by the components of FIG. 1 in verifying whether a digital component provided for display within the webview is provided by the intended content provider.

FIG. 3 is a block diagram 300 that illustrates operations performed by the components of FIG. 1 in verifying whether a digital component provided for display within the webview is provided by the intended content provider.

As in FIG. 2, FIG. 3 shows operations/interactions occurring within the native application 118 and in particular, shows the operations/interactions occurring between the native layer 122 and the webview 126 (both of which have already been described above with reference to FIGS. 1 and 2).

When the webview 126 is launched, the webview 126 (or alternatively, a script 327 executing within the webview 126) requests digital content (using request 316) from a content provider 108. In some implementations, the request for digital content (which is also simply referred to as "request for content") that is generated by the script executing in the webview is a packetized data request including a header and payload data. The request for content page can include event data specifying features such as, e.g., a name (or network location) of a content provider from which the digital component is being requested and a name (or network location) of the requesting device (e.g., the client device 102). In some implementations, the event data specifying event features can include the location of the digital component. For example, the request for content generated by the script 327 executing in the webview 126 of the application 118 may include the URL or another resource identifier of the digital component.

In some implementations, the script 327 can include with the request for content, a unique identifier (UID) assigned to the webview and the environment trustworthiness data. In such implementations, the script initially sends a request for the environment trustworthiness data via the communication bridge 120 to the software library 123 residing in the native layer 122. This request can include the UID 314 of the webview, which can be used by the software library 123 to verify that the request for the environment trustworthiness data in fact originates from the webview 126 (e.g., by comparing the UID of the webview 126 stored in native layer 122 with the received UID). Upon performing such verification, the software library 123 generates the environment trustworthiness data as described with reference to FIG. 2 and provides this environment trustworthiness data to the webview via the communication bridge 120.

In some implementations, the software library 123 encrypts the environment trustworthiness data and the webview UID in an encrypted dataset and includes this dataset in the response 312, which the software library 123 provides to the webview 126. The software library can generate the encrypted dataset using, e.g., asymmetric encryption algorithms. As part of such encryption, the software library generates the encrypted dataset using the public key of the content provider 108.

The script 327 then includes this encrypted dataset along with the request for content 316. Though not shown in the diagram, the request 316 for digital content is transmitted to the content provider 108 over the network 104.

Upon receiving the request for content 316, the content provider 108 can decrypt the encrypted data set (e.g., if asymmetric encryption is used, using the content provider's private key) to obtain the unencrypted unique identifier 314a and the event trustworthiness data. The content provider 108 generates a response 318 with data that includes the digital component 304 (or a resource identifier, e.g., a URL, for the digital component 304) as well as the decrypted unique identifier 314a. Though not shown in FIG. 3, the response 318 is transmitted over the network 104 to the script 127 in the webview 126 of the application 118 executing on the client device 102A.

Upon receiving the response 318, the script 327 provides the unique identifier (UID) 314a included in the response 318 to the software library 123 via the communication bridge 120. The software library 123 compares the UID 314a with the UID 314 for the Webview 126 that is stored in the native layer 122. If the UIDs match based on this comparison/evaluation, the software library 123 determines that the digital component was in fact received from the intended content provider 108 (i.e., the content provider 108 to which the request for content 316 was sent). On the other hand, if the UID does not match based on this evaluation, the software library 123 determines that the received digital component was provided by an entity other than the intended content provider 108 (i.e., the content provider 108 to which the request for content 316 was sent). The software library generates evaluation results 315, which includes an indication of whether the digital component was in fact received from the intended content provider 108, and provides the evaluation results 315 to the script 327.

Based on the evaluation results, the script 327 can be configured to either provide for display or prevent display of the digital component provided in response 318. For example, the script 327 can be configured to not present the digital component received in response 318 within the webview 126, if the evaluation results 315 indicate that the digital component received in response 318 was not received from the intended content provider 108 (i.e., if the UID 314*a* in the response 318 is not the same as the UID 314 of the webview 126). This would save resources such as processing power, memory usage, and battery power of the client device 102A. On the other hand, the script 327 can be configured to present the digital component that is provided in response 318 within the webview 126, if the evaluation results 315 indicate that the digital component received in response 318 was received from the intended content provider 108 (i.e., if the UID 314*a* in the response 318 is the same as the UID 314 of the webview 126, as described in the preceding paragraph).

Figure 4:
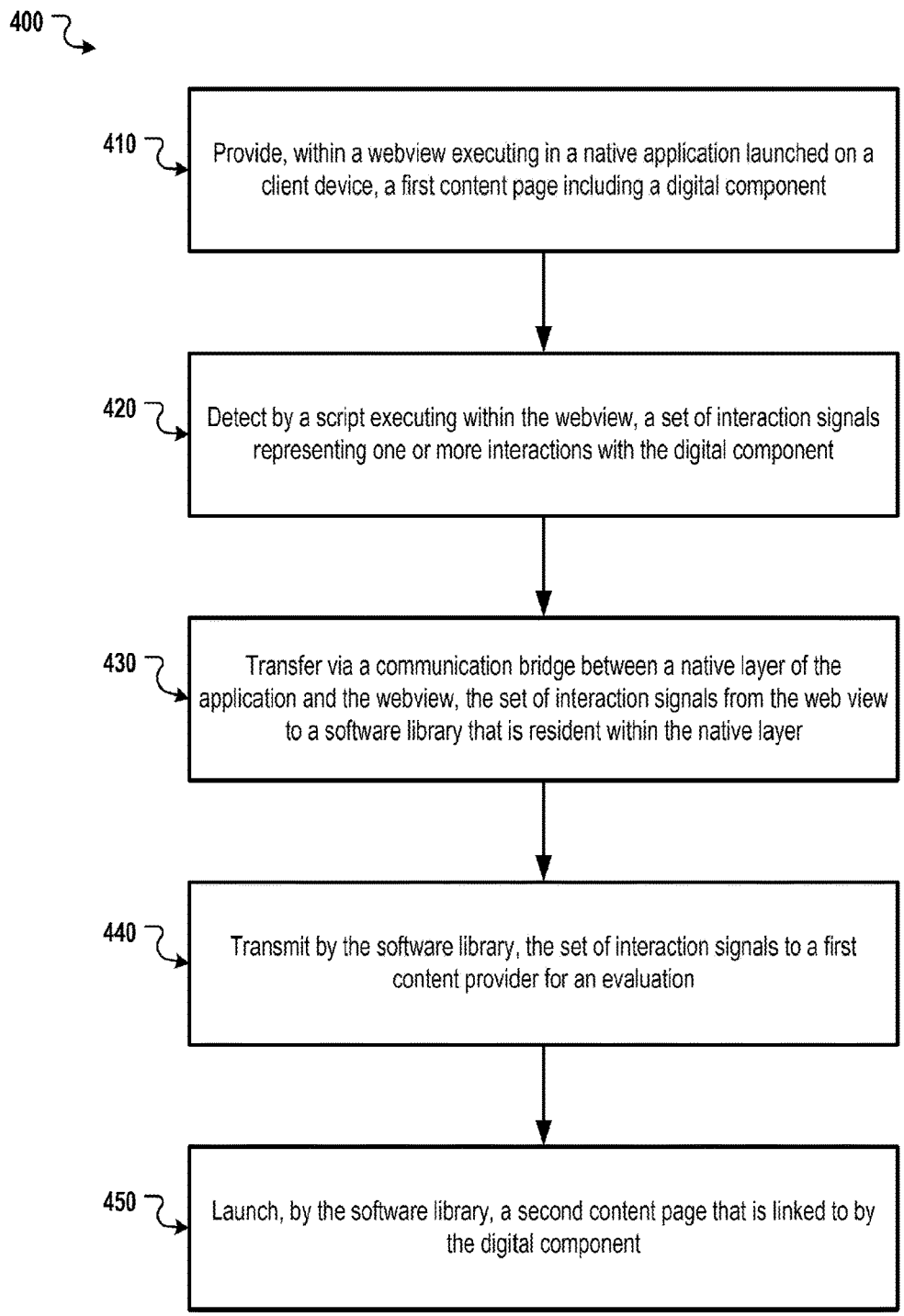
FIG. 4 is a flow diagram of an example process for verifying whether interactions with digital components provided within a webview are interactions by an actual human user.

FIG. 4 is a flow diagram of an example process 400 for verifying whether interactions with digital components provided within a webview are interactions by an actual human user. Operations of process 400 are described below as being performed by the components of the system described and depicted in FIGS. 1, 2 and 3. Operations of the process 400 are described below for illustration purposes only. Operations of the process 400 can be performed by any appropriate device or system, e.g., any appropriate data processing apparatus. Operations of the process 400 can also be implemented as instructions stored on a non-transitory computer readable medium. Execution of the instructions cause one or more data processing apparatus to perform operations of the process 400.

A first content page including a digital component is provided in a webview executing in a native application launched on a client device (410). In some implementations, and as described above with reference to FIG. 2, a client device 102A (e.g., a smartphone) accesses a first content page 202 (that is provided by the first content provider 108) that is provided for display within the webview 126. The first content page 202 further includes a digital component 204 that links to a second content page (which can be provided by either the first content provider or a second content provider (e.g., any other content provider other than the first content provider).

A script executing within the webview detects a set of interaction signals representing one or more interactions with the digital component (420). In some implementations, the webview 126 of the application 118 executing on the client device 102A loads a script 127 along with the content page 202 that is provided by a content provider 108. In some instances, interactions with the digital component 204 may be recorded by the webview. To enable verification of whether the interactions with the digital component 204 within the webview are performed by an actual human user of the client device (as opposed to, e.g., an interaction that was triggered due to a software defect/bug and/or due to execution of certain malicious code), the script executing within the webview detects a set of interaction signals based on the detected interaction with the digital component (as further described with reference to FIG. 2).

Transfer the set of interaction signals from the webview to a software library that is resident within the native layer via a communication bridge between a native layer of the application and the webview (430). In some implementations, after detecting the set of interaction signals, the script 127 executing in the webview 126 transmits the set of interaction signals to the software library 123 in the native layer 122 of the application 118 via the communication bridge 120.

The software library transmits the set of interaction signals to a first content provider for evaluation (440). In some implementations, after receiving the set of interaction signals from the webview of the application (via the communication bridge), the software library in the native layer of the application transmits the set of interaction signals to the content provider for verification. For example, the software library 123 after receiving the set of interaction signals 210 from the script 127, transmits the set of interaction signals 210 to the content provider 108.

In some implementations, in addition to transmitting the set of interaction signals, the software library 123 also collects and transmits the environment trustworthiness data to the content provider 108 (as described further with reference to FIGS. 2 and 3). As described above with reference to FIG. 2, in some implementations, the content provider may use the interaction signals and/or the event trustworthiness data, to evaluate/verify whether the interactions with the digital component within the webview are generated by an actual human user of the client device.

Launch, by the software library, a second content page that is linked to by the digital component (450). In some implementations, the software library 123 appends data representing the set of interaction signals and the environment trustworthiness data to a uniform resource locator (URL) for a second content page that is provided by the first content provider and that is linked to by the digital component. The software library 123 then launches a web browser application (that is different from the native application) and accesses this URL for the second page within the web browser application.

Figure 5:
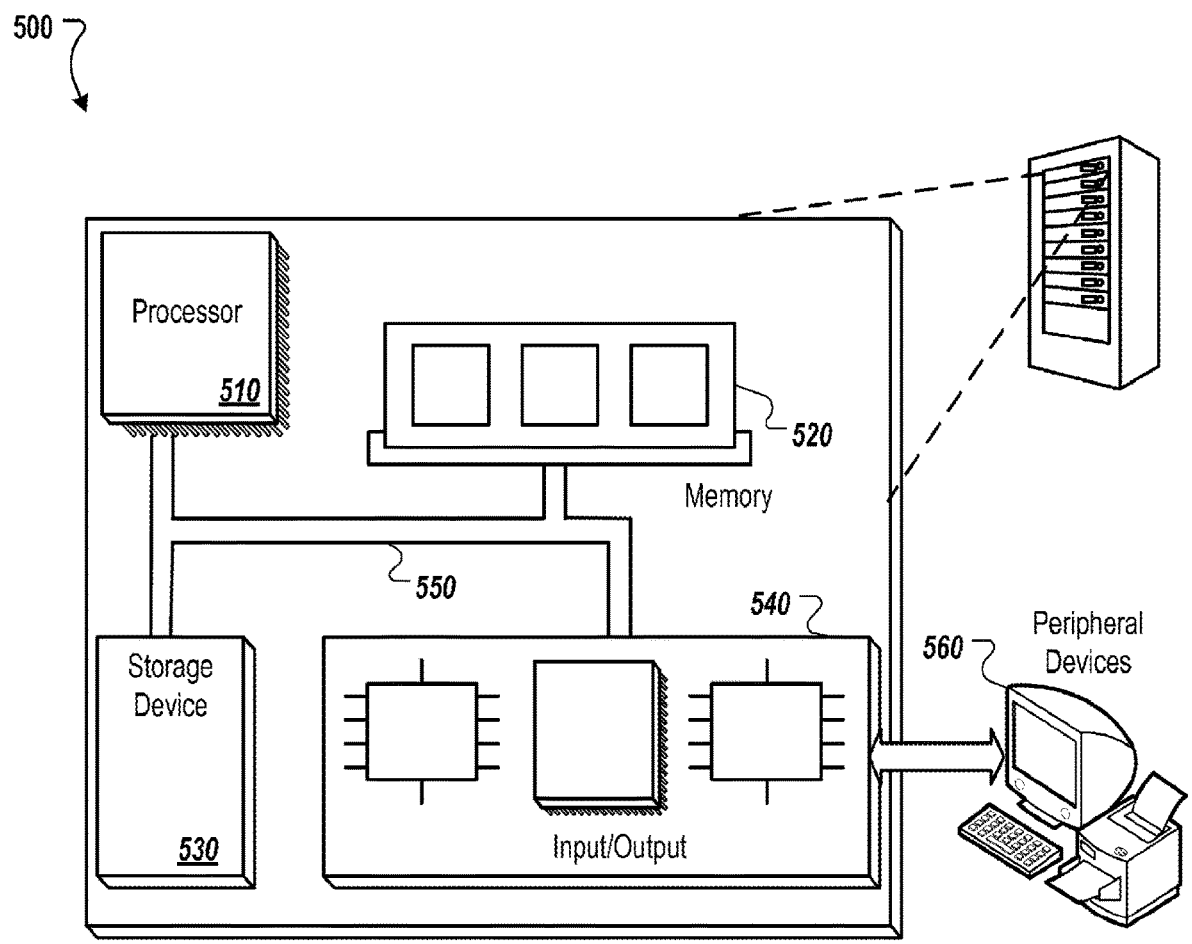
FIG. 5 is a block diagram of an example computer system that can be used to perform operations described.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   providing, within a webview executing in a portion of a native application launched on a client device, a first content page comprising a digital component, wherein the native application is an application other than a web browser and the webview is a browser engine included within the native application;
   detecting, by a script executing within the webview, a set of interaction signals representing one or more interactions with the digital component;
   transferring, via a communication bridge between a native layer of the native application and the webview, the set of interaction signals from the webview to a software library that is resident within the native layer;
   generating, by the software library, using a public encryption key of a first content provider, environment trustworthiness data that comprises encrypted data about the native application and the client device;
   transmitting, by the software library, the set of interaction signals and the environment trustworthiness data to the first content provider that evaluates whether the set of interaction signals indicate interactions by a human user of the client device with the digital component instead of an automated interaction, wherein the evaluation is based on processing of the interaction signals and the environment trustworthiness data using a machine learning model; and
   launching, by the software library and in response to the one or more interactions with the digital component, a second content page that is linked to by the digital component and that is provided by the first content provider.

2. The computer-implemented method of claim 1, wherein providing the digital component within the webview comprises:
   generating, by the script executing within the webview, a request for digital content, wherein the request comprises a unique identifier for the webview that is assigned to the webview by the native layer;
   providing the request for digital content to a second content provider, wherein the second content provider is different from the first content provider;
   in response to providing the request for digital content to the second content provider, receiving, from the second content provider, data comprising the digital component and the unique identifier;
   verifying that the data received from the second content provider comprises the unique identifier;
   in response to verifying that the data received from the second content provider comprises the unique identifier, providing the digital component within the webview.

3. The computer-implemented method of claim 2, further comprising:
   sending, by the script and via the communication bridge, a request for environment trustworthiness data to the software library.

4. The computer-implemented method of claim 3, wherein the request for digital content comprises an encrypted dataset that is generated by encrypting the environment trustworthiness data and the unique identifier.

5. The computer-implemented method of claim 2, wherein verifying that the data received from the second content provider comprises the unique identifier:
   determining, by the software library, that the unique identifier of the webview matches the unique identifier that was included in the data that was received from the second content provider.

6. The computer-implemented method of claim 1, wherein launching the second content page is executed in response to the evaluation of the interaction signals indicating interaction by a human user.

7. The computer-implemented method of claim 1, wherein providing the set of interaction signals and the environment trustworthiness data to the first content provider comprises appending data representing the set of interaction signals and the environment trustworthiness data to a uniform resource locator (URL) for the second content page that is provided by the first content provider and that is linked to by the digital component.

8. The computer-implemented method of claim 1, wherein launching the second content page comprises launching a web browser application and accessing the URL for the second content page within the web browser application.

9. A non-transitory computer readable medium storing instructions that, when executed by one or more data processing apparatus, cause the one or more data processing apparatus to perform operations comprising:
   providing, within a webview executing in a portion of a native application launched on a client device, a first content page comprising a digital component, wherein the native application is an application other than a web browser and the webview is a browser engine included within the native application;
   detecting, by a script executing within the webview, a set of interaction signals representing one or more interactions with the digital component;
   transferring, via a communication bridge between a native layer of the native application and the webview, the set of interaction signals from the webview to a software library that is resident within the native layer;
   generating, by the software library, using a public encryption key of a first content provider, environment trustworthiness data that comprises encrypted data about the native application and the client device;
   transmitting, by the software library, the set of interaction signals and the environment trustworthiness data to the first content provider that evaluates whether the set of interaction signals indicate interactions by a human user of the client device with the digital component instead of an automated interaction, wherein the evaluation is based on processing of the interaction signals and the environment trustworthiness data using a machine learning model; and
   launching, by the software library and in response to the one or more interactions with the digital component, a second content page that is linked to by the digital component and that is provided by the first content provider.

10. The non-transitory computer readable medium of claim 9, wherein providing the digital component within the webview comprises:
   generating, by the script executing within the webview, a request for digital content, wherein the request comprises a unique identifier for the webview that is assigned to the webview by the native layer;
   providing the request for digital content to a second content provider, wherein the second content provider is different from the first content provider;
   in response to providing the request for digital content to the second content provider, receiving, from the second content provider, data comprising the digital component and the unique identifier;
   verifying that the data received from the second content provider comprises the unique identifier;
   in response to verifying that the data received from the second content provider comprises the unique identifier, providing the digital component within the webview.

11. A system, comprising:
   at least one processor; and
   at least one memory storing instructions that, when executed by the at least one processor, cause performance of operations, comprising:
      providing, within a webview executing in a portion of a native application launched on a client device, a first content page comprising a digital component;
      detecting, by a script executing within the webview, a set of interaction signals representing one or more interactions with the digital component;
      transferring, via a communication bridge between a native layer of the native application and the webview, the set of interaction signals from the webview to a software library that is resident within the native layer;
      generating, by the software library, using a public encryption key of a first content provider, environment trustworthiness data that comprises encrypted data about the native application and the client device;
      transmitting, by the software library, the set of interaction signals and the environment trustworthiness data to the first content provider, that evaluates whether the set of interaction signals indicate interactions by a human user of the client device with the digital component instead of an automated interaction, wherein the evaluation is based on processing of the interaction signals and the environment trustworthiness data using a machine learning model; and
      launching, by the software library and in response to the one or more interactions with the digital component, a second content page that is linked to by the digital component and that is provided by the first content provider.

12. The system of claim 11, wherein providing the digital component within the webview comprises:
   generating, by the script executing within the webview, a request for digital content, wherein the request comprises a unique identifier for the webview that is assigned to the webview by the native layer;
   providing the request for digital content to a second content provider, wherein the second content provider is different from the first content provider;
   in response to providing the request for digital content to the second content provider, receiving, from the second content provider, data comprising the digital component and the unique identifier;
   verifying that the data received from the second content provider comprises the unique identifier; and
   in response to verifying that the data received from the second content provider comprises the unique identifier, providing the digital component within the webview.

13. The system of claim 12, further comprising:
   sending, by the script and via the communication bridge, a request for environment trustworthiness data to the software library, wherein the environment trustworthiness data comprises data about the native application and the client device for assessing a trustworthiness of the native application and the client device.

14. The system of claim 13, wherein the request for digital content comprises an encrypted dataset that is generated by encrypting the environment trustworthiness data and the unique identifier.

15. The system of claim 12, wherein verifying that the data received from the content provider comprises the unique identifier:
   determining, by the software library, that the unique identifier of the webview matches the unique identifier that was included in the data that was received from the content provider.

16. The system of claim 11, wherein the launching the second content page is executed in response to the evaluation of the interaction signals indicating interaction by a human user.

17. The system of claim 11, wherein transmitting the set of interaction signals and the environment trustworthiness comprises appending data representing the set of interaction signals and the environment trustworthiness data to a uniform resource locator (URL) for the second content page that is provided by the first content provider and that is linked to by the digital component.

18. The system of claim 11, wherein launching the second content page comprises launching a web browser application and accessing the URL for the second content page within the web browser application.

* * * * *